United States Patent
Daoud

[19]

[11] Patent Number: 6,115,467
[45] Date of Patent: Sep. 5, 2000

[54] MODULAR LAYERED NETWORK INTERFACE UNIT PARTICULARLY SUITED FOR SIDE EXPANSION

[75] Inventor: Bassel Hage Daoud, Parsippany, N.J.

[73] Assignee: Lucent Technologies, Inc., Murray Hill, N.J.

[21] Appl. No.: 09/163,702

[22] Filed: Sep. 30, 1998

[51] Int. Cl.[7] .................................................. H04M 1/00
[52] U.S. Cl. ............................................................ 379/399
[58] Field of Search .................................... 379/399, 326, 379/327, 328, 329; 361/415, 428

[56] References Cited

U.S. PATENT DOCUMENTS

| | | | |
|---|---|---|---|
| 5,312,266 | 5/1994 | Daoud | 379/399 |
| 5,363,440 | 11/1994 | Daoud | 379/399 |

*Primary Examiner*—Jack Chiang
*Attorney, Agent, or Firm*—Howard C. Miskin, Esq.; Gloria Tsui-Yip, Esq.

[57] ABSTRACT

A network interface unit is disclosed having two layers of equipment and a hinged arrangement that allows the layers of the equipment to be swung out away from each other to facilitate maintenance and to decrease wiring density, while at the same time also providing side expansion capabilities of the network interface unit.

11 Claims, 4 Drawing Sheets

MODULAR LAYERED NETWORK INTERFACE UNIT PARTICULARLY SUITED FOR SIDE EXPANSION

BACKGROUND OF THE INVENTION

This invention relates to telecommunications apparatus and, in particular, to network interface units and building entrance protector units.

Network interface units are known in the art and one such unit is disclosed in U.S. Pat. No. 5,363,440 ('440) of Daoud, and which is herein incorporated by reference. As discussed in the '440 patent, network interface units constitute the demarcation between the customer's equipment and a network such as a telephone or data network. In buildings including multiple subscribers, the network interface unit is typically mounted in a basement and includes an array of customer bridges, each bridge being coupled to an individual subscriber line. The bridges are typically coupled to the phone network through an RJ11 jack and plug so that the customer can plug a working phone into the jack to determine if any problems lie in the customer or network side of the telecommunications system.

Network interface units have recently utilized a layered design in which one layer of devices and their associated cabling is arranged on top of another layer of devices and their associated cabling. Network interface units having layered arrangements, serve well their intended purpose, but because of the ever increasing demands of telecommunication systems the internal wiring density within the network interface unit is constantly increasing making maintenance and installation tasks of the service technician more and more difficult. Increased wiring density is especially noticed in the cabling between the layers of devices of the network interface units. It is desired to have an arrangement for a network interface unit where its layers of the devices may be folded away from each other for easy access thereto and provide a network interface unit that has enclose side-by-side layers of devices therein.

SUMMARY OF THE INVENTION

The invention in one aspect is a network interface unit for servicing a multiplicity of subscribers and having folding capabilities to arrange its layers of devices in a side-by-side manner to provide easy accessibility.

The network interface unit has a base portion and comprises first and second modular layers, first and second trays, a cover, at least one hinge and devices for releasably connecting the cover to either tray.

The first modular layer includes an array of customer bridges mounted on a first platform and each is adapted for coupling to a different line of a subscriber and having a cabled wiring for electrically connecting between each of the customer bridges and the lines of the subscribers. The first platform has mounting devices.

The second modular layer includes at least one connection device mounted on a second platform and having a first section for crimping to electrical wires and a second section for connecting to the lines of the subscribers by way of a cabled wiring running in a predetermined direction. The second platform has mounting devices.

The first tray has first and second sides and holds the first platform. The first side of the first tray is arranged in a direction which is perpendicular to the predetermined direction of the second cabled wiring. The first platform is mounted to the bottom of the first tray by way of its platform mounting devices.

The second tray has first and second sides and holds the second platform. The first side of the second tray is arranged in a direction which is perpendicular to the predetermined direction of the cabled wiring between the second section for connecting and the lines of the subscribers. The second tray has first and second columns having top and bottom portions and respectively located on the first and second sides of the second tray.

The second platform is mounted to the bottom portion of each of the columns by way of its mounting devices so that the first section of the connection device for crimping is facing the same direction as the bottom portion of the columns. At least one hinge pivotally attaches the first sides of the corresponding first and second trays and allows the second tray to rest on the first tray in a closed position therebetween. At least one hinge also allows the second tray to swing away from the first tray when being moved and also allows the second tray to lay alongside the first tray in an opened position.

The cover has first and second sides and first and second releasable devices having first and second portions for releasably connecting the cover and which are located on the second side of the corresponding first and second trays. The first portion of the first and second releasable devices are attached to the first side of the cover and the cover is releasably connected to the second tray.

BRIEF DESCRIPTION OF THE DRAWINGS

These and other features of the invention are delineated in detail in the following description. In the drawings.

It will be appreciated that, for purposes of illustration, these figures are not necessarily drawn to scale.

DETAILED DESCRIPTION OF THE PREFERRED EMBODIMENTS

Figure 1:
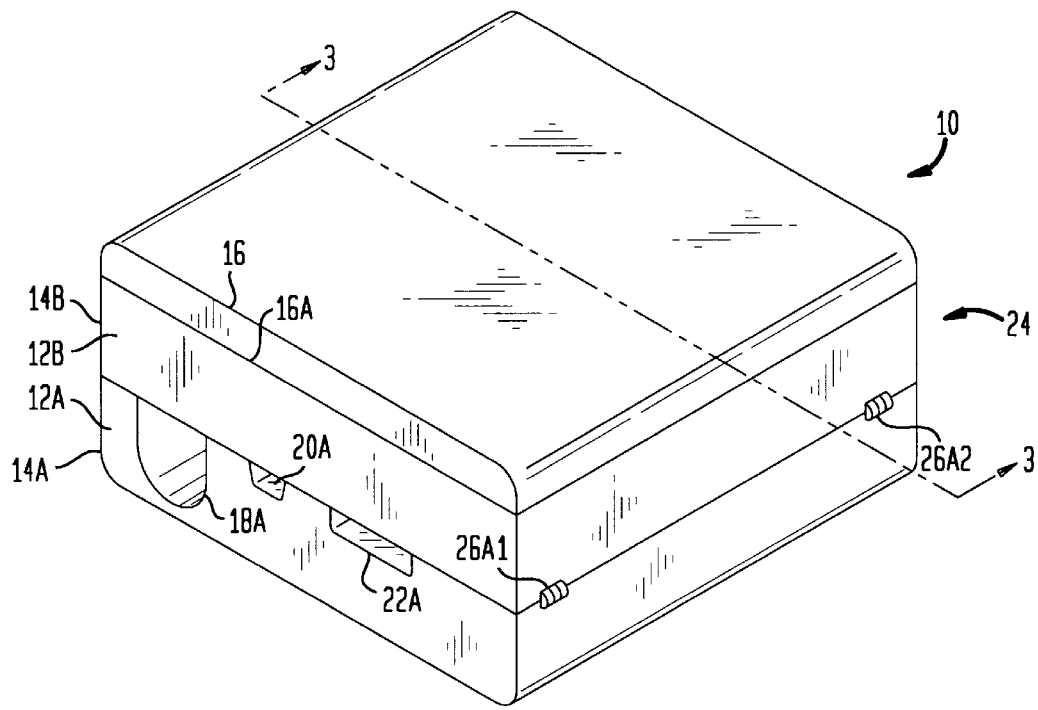
FIG. 1 is a front perspective view of a network interface unit in accordance with an embodiment of the invention and illustrated therein to show the first side of the network interface unit.
Figure 2:
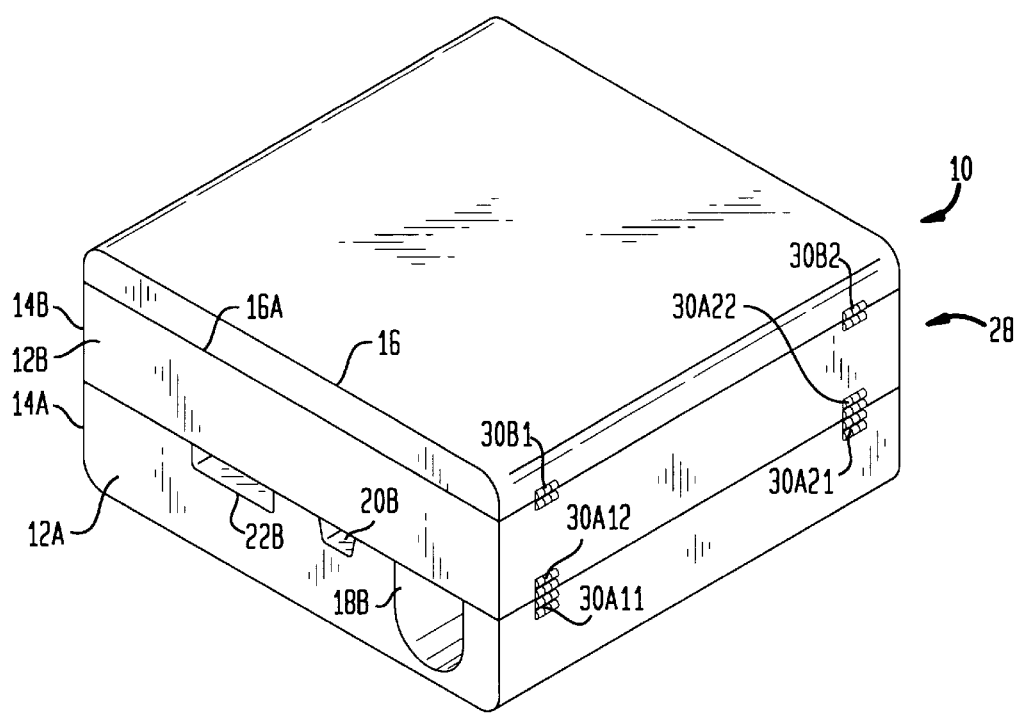
FIG. 2 is a rear perspective view and illustrated to show the second side of the network interface unit.

FIG. 1 illustrates primarily the network interface unit 10 comprising first and second modular layers 12A and 12B that are respectively housed by first and second trays 14A and 14B with the second tray 14B for the embodiment of FIG. 1 having a cover 16 resting thereupon having a lower edge 16A thereof. The first tray 14A has opening 18A, 20A and 22A for the entrance and/or exit of wires and/or cables. The network interface unit 10 has a hinge side 24 that has at least one, but preferably two pivotal hinges 26A1 and 26A2. The network interface unit 10 also has a cover attachment side 28 that is shown in FIG. 2 which also shows openings 18B, 20B and 22B of tray 14A that respectively cooperate with the opening 18A, 20A and 22A for passing wires and/or cables associated with the network interface unit 10.

The cover attachment side 28 has devices 30A11–30A12; 30A21–30A22; 30B1 and 30B2 all of which releasably connect to the cover 16, wherein the pairs 30A11–30A12 and 30A21 and 30A22 operatively cooperate with each other. More particularly, devices 30A11 and 30A21 releasably connect cover 16 to the first tray 14A in a manner to be described with reference to FIGS. 4 and 6, and devices 30B1 and 30B2 releasably connect the cover 16 to the second tray 14B in a manner that may be further described with reference to FIG. 3, which is a cross-sectional view taken along line 3—3 of FIG. 1.

Figure 3:
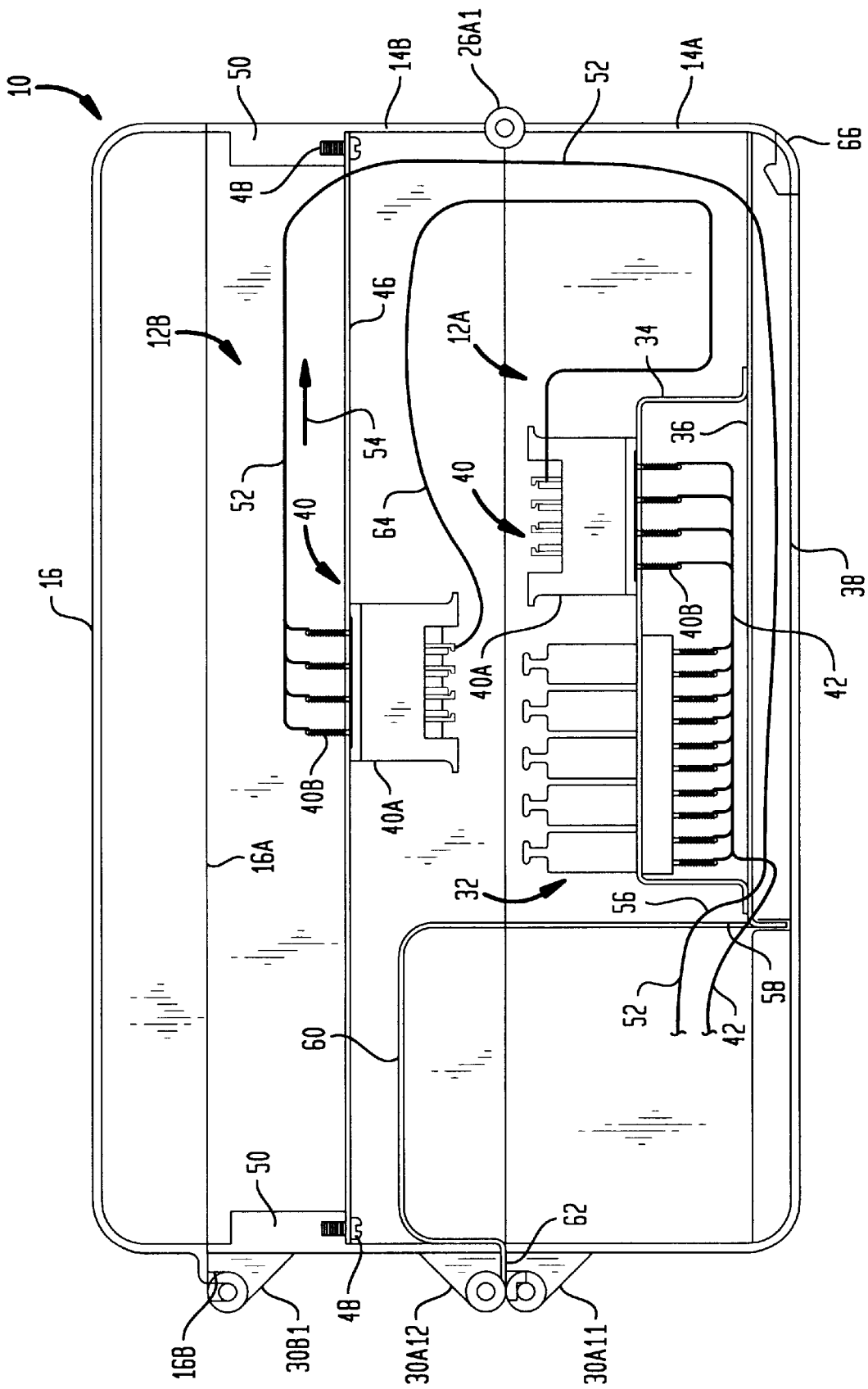
FIG. 3 is a cross-sectional view of the network interface unit taken along line 3—3 of FIG. 1.

FIG. 3 illustrates the cover 16 as being attached to the device 30B1 by means of a hook member 16B (shown most clearly in FIG. 4) that is preferably part of the cover 16 and that slips under and then engages the device 30B1 for releasable attachment thereto. FIG. 3 further illustrates that the first modular layer 12A including an array 32 of customer bridges mounted on a first platform 34 with each customer bridge being adapted for coupling to a different line of a subscriber, such as a telephone subscriber. The platform 34 has mounting devices 36 for connecting to the bottom portion 38 of the first tray 14A. The mounting devices 36 may comprise bracing members having portions that fit into complementary portions of the bottom portion 38 for attachment thereto.

The first modular layer 14A further comprises a second device 40, which serves as a connection device, mounted on the first platform 34 and having a first section 40A crimping to electrical wires and a second section 40B with wire-wrap ends thereof for connecting to the lines of the subscribers. The array 32 and the connection device 40 have a first cabled wiring 42 for electrically connecting to the lines of the subscribers.

FIG. 3 illustrates the second modular layer 12B that includes at least one connecting device 40 mounted on a second platform 46 and having a first section 40A for crimping to electrical wires and a second section 40B for connecting to the lines of the subscribers. The second platform 46 has mounting devices, such as screws 48, that are screwed into the bottom portion of columns 50 located on both the first side (same side as hinge 26A1) and second side (same as releasable retainer 30B1) of the second tray 14B. The first section 40A of the second connection device 40 is facing downward (as viewed in FIG. 3) in the same direction as the bottom portion of each of the columns 50. The second connection device 40 is connected to the subscribers by way of a second cabled wiring 52, running in a predetermined direction 54. The second cabled wiring 52, as well as the first cabling wiring 42, run into either or both of the openings 18A and 18B of FIGS. 1 and 2, respectively, by passing through openings 56 and 58, respectively, of an arched member 60 that is connected to releasable retainer 30A11 by hook member 62, similar to the first and second connection hook member 16B. The first sections 40A of the devices 40 located on both the first and second platforms 34 and 46, respectively, are interconnected by a third cabled wiring 64.

The first tray 14A has first and second sides and holds the first platform 34. The first side of the first tray 14A is arranged in a direction which is perpendicular to the predetermined direction 54 of the second cabled wiring 52 as seen in FIG. 3. The second side of the first tray 14A carries the releasable retainer 30A11 and its bottom portion 38 has a cutout 66 that is used to interconnect the first and second trays 14A and 14B in a manner to be further described hereinafter with reference to FIGS. 4 and 5.

The second tray 14B has first and second sides and holds the second platform 46. The first side of the second tray 14B is arranged in a direction which is perpendicular to the predetermined direction 54 of the second cabled wiring 52 as shown in FIG. 3. The pivotal hinges 26A1 and 26A2 are attached to the first sides of the first and second trays 14A and 14B, respectively, and so that the second tray 14B rests on the first tray 14A in a closed position therebetween, as seen in FIG. 3. The pivotal hinges 26A1 and 26A2 are also attached to the first and second trays 14A and 14B, respectively, so that the second tray 14B swings away from the first tray 14A when being moved and also allows the second tray 14B to lay alongside the first tray 14A in an opened position. The pivotal hinging between the first and second trays 14A and 14B may be further described with reference to FIG. 4.

Figure 4:
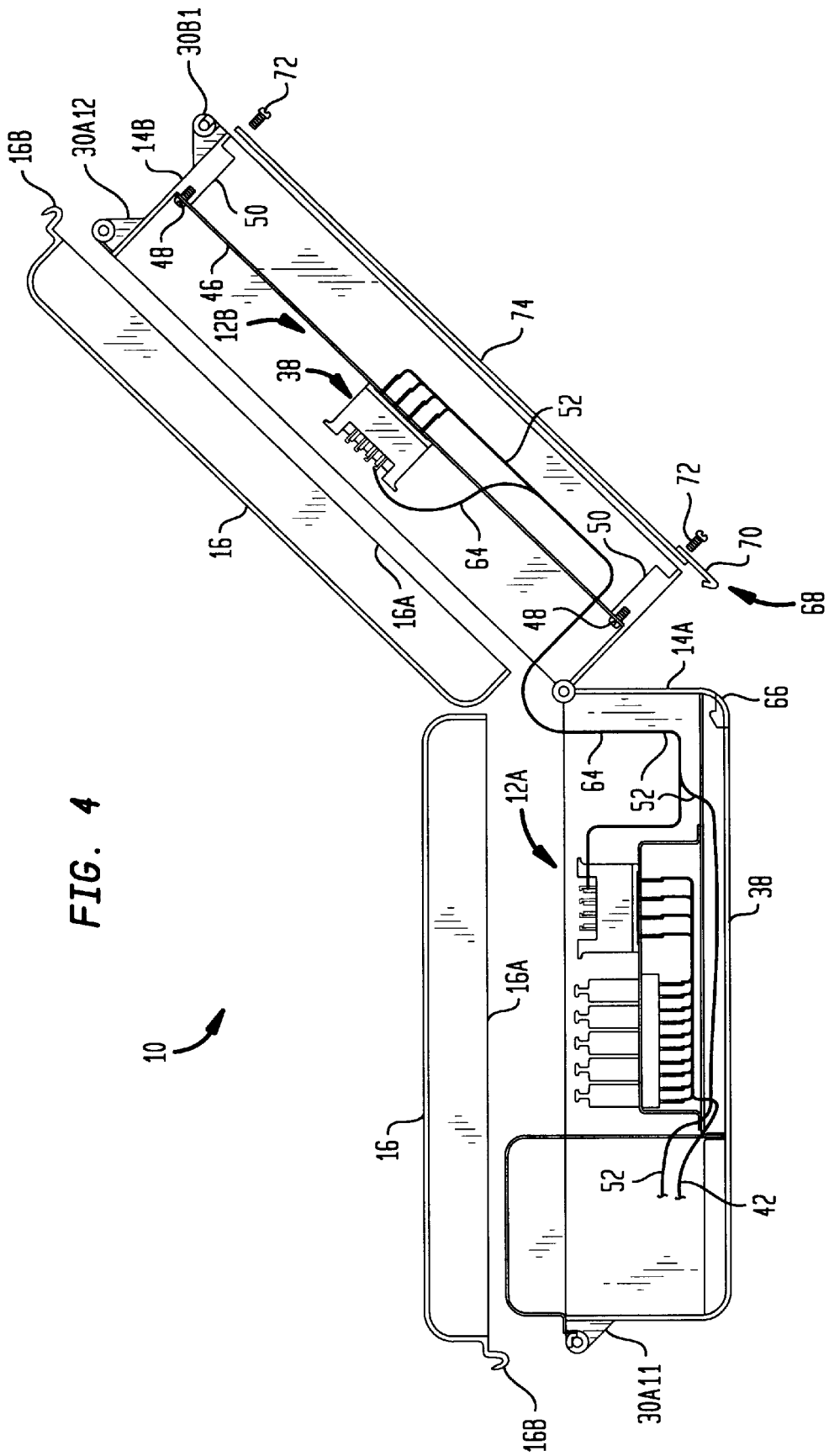
FIG. 4 illustrates the network interface unit of FIG. 3 partially swung open and having a second cover and a bottom plate both ready to be assembled to the second tray so as to provide a network interface unit having side-by-side modular layers.

FIG. 4 illustrates the second tray 14B as being partially swung away from the first tray 14A, but more importantly, FIG. 4 shows, as compared to the arrangement of FIG. 3, show the second modular layer 12B as being folded away from the first modular layer 12A. As will be further described hereinafter with reference to FIG. 6, the folding capability of the network interface unit 10 alleviates the wiring density problems described in the "Background" section.

FIG. 4 illustrates the bottom portion 38 of the first tray 12A as having the cutout 66 which comprises part of the latching device 68. More particularly, the latching device 68 comprises a first and second sections, with the first section being provided by the cutout 66 and the second section being provided by an extending member 70, having dimensions complementary to the cutout 66 and insertable therein. The second section 70 is connected to the top portion of column 50 on the first side of first tray 12A by at least one screw 72 inserted through an opening (not shown) in a plate 74 and screwed into column 50. The plate 74 is also connected to the column 50 on the second side of the second tray 14B by means of a screw 72. The plate 74 closes off the bottom portion of the second tray 14B which has its upper portion closed off by a cover 16 having a hook member 16B engageable with the releasable retainer 30A12. An alternate embodiment by which the plate 74 may be interconnected to the bottom portion 38 of the first tray 14A and also to the second tray 14B may be further described with reference to FIG. 5.

Figure 5:
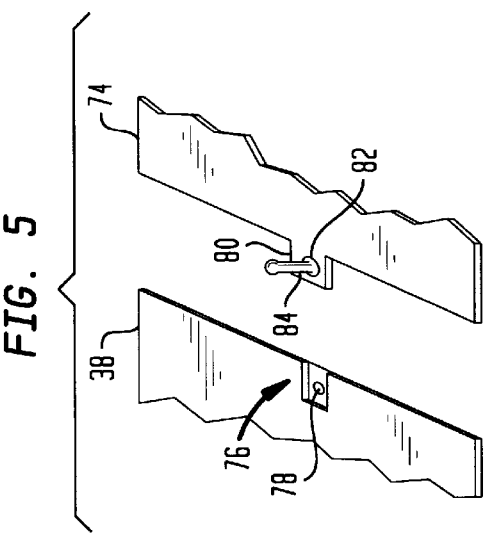
FIG. 5 illustrates an alternative embodiment of connecting a plate of the second modular layer to the bottom portion of the first tray holding the first modular layer.

FIG. 5 illustrates a second latching mechanism 76 located in the bottom portion 38 of the first tray 14A and having a recessed section 78 with a threaded opening therein. FIG. 5 further illustrates the plate 74 as having an extension 80 with an opening 82 therein capable of being lined up with the threaded opening of the recess 78. The second latching mechanism 76 further comprises a screw 84 that is insertable into the opening 82 of the plate 74 and into the opening of the recess 78 so as to engage the threads in the bottom portion 38. The plate 74 is attached to the bottom portion 38 of the first tray 14A by the screw 84. Further, the plate 74 is attached to the second tray 14B by way of at least one, but preferable two screws 72 (not shown in FIG. 5, but shown in FIG. 4) that are screwed into columns 50.

Figure 6:
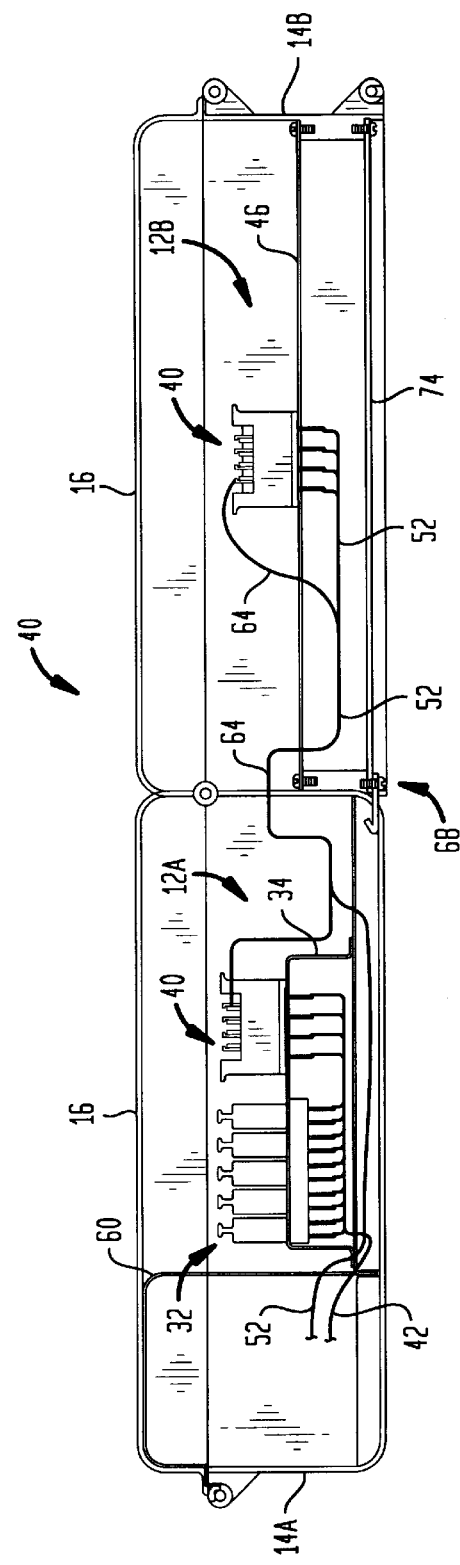
FIG. 6 illustrates a fully folded-out first and second modular layers 12A and 12B so as to lay side-by-side and which illustrates the side expansion capabilities of the network interface unit.

The overall benefits of the network interface unit 10 of the present invention may be further described with reference to FIG. 6 which illustrates the arrangement of FIG. 3 and 4 in their fully folded-out positions so that the first and second modular layers 12A and 12B lay side-by-side each other. More particularly, FIG. 6 illustrates the side expansion capabilities of the network interface unit 10. From FIG. 6 it is seen that the cable runs 52 and 64 are provided with sufficient slack so that the first and second modular layers 12A and 12B, respectively, may be folded out so as to reveal the components thereof. Such foldout capabilities of the network interface unit 10 allow for any maintenance thereon of all of the components of the modular layers 12A and 12B.

From FIG. 6 it is seen that the first tray 14A and thus the first modular layer 12A has a separate cover 16 thereover and, similarly, the second tray 14B and thus the second modular layer 12B has a separate cover 16 thereover. Further, the first and second trays 14A and 14B, respectively, are interconnected by latching device 68, but if desired the latching mechanism of 76 of FIG. 5 may be used to releasably connect together first and second trays 14A and 14B. Further, the side-by-side arrangement of FIG. 6 has the bottom portion closed off and thus protected against contaminants of the environment by the plate 74. Further, it is seen that the first and second trays 14A and 14B may be selected to have the same height so as to provide the equal height of the side-by-side arrangement of FIG. 6. Moreover, from FIG. 6 it is seen that any wiring density problems that may have been present in the configuration of FIG. 3 have been substantially eliminated in the side-by-side arrangement of FIG. 6.

It should now be appreciated that the practices of the present invention provides for a network interface unit 10 having modular layers that may be folded away from one another so that the needed components for the network interface unit may be easily lodged therein, while at the same time allowing for separate examination of the modular layers for maintenance and installation purposes.

Various additional modifications will become apparent to those skilled in the art. All such variations, which basically rely on the teachings to which the invention has advanced the art, are properly considered within the scope of this invention.

What I claim is:

1. A network interface unit for servicing a multiplicity of subscribers and comprising:
   a) a first modular layer including a first platform having mounting devices;
   b) a second modular layer including a second platform having a cabled wiring running in a predetermined direction, said second platform having mounting devices;
   c) a first tray having first and second sides and holding said first platform, said first side of said first tray being arranged in a direction which is perpendicular to said predetermined direction of said cabled wiring, said first platform being mounted to the bottom of said first tray by way of said first platform mounting devices;
   d) a second tray having first and second sides and holding said second platform, said first side of said second tray being arranged in a direction which is perpendicular to said predetermined direction of said cabled wiring, said second tray having first and second columns respectively located on said first and second sides thereof and having top and bottom portions, said second platform being mounted by way of its mounting devices to said bottom portion of each of said columns so that said first section of said connection device is facing in the same direction as said bottom portion of said columns;
   e) at least one hinge for pivotally attaching together said first sides of said first and second trays and so that said second tray rests on said first tray in a closed position therebetween and so that said second tray swings away from said first tray when being moved and lays alongside said first tray in an opened position;
   f) a cover having first and second sides;
   g) first and second releasable devices for releasing or connecting said cover and located on the second sides of said first and second trays.

2. The network interface unit according to claim 1 wherein said first tray has a bottom portion and said network interface unit further comprises a latching device having first and second sections with the first section being connectable to the first side of the bottom portion to the first tray and the second section being connectable to the top portion of the column on the first side of said second tray.

3. The network interface unit according to claim 2 further comprises a plate having first and second opening with the first opening thereof lining up with the top portion of the column on the first side of said second tray and with the second opening thereof lining up with the top portion of the column on the second side of said second tray.

4. The network interface unit according to claim 3, wherein said top portion of the column at said first and second sides are adapted to receive a screw and said plate and said second portion of said latching device are connected to the respective columns by way of screws inserted through said plate and said second portion of said latching device and into said top portion of said column at said first side of said second tray.

5. The network interface unit according to claim 1 further comprising an arched member abutted against said first platform and having openings to allow passage of said first and second cabled wiring.

6. The network interface unit according to claim 1 further comprising an array of customer bridges mounted on said first platform, each customer bridge adapted for coupling to a different line of a subscriber.

7. The network interface unit according to claim 6 further comprising an additional cabled wiring for electrically connecting between each of said customer bridges and said lines of said subscribers.

8. The network interface unit according to claim 6 further comprising at least one connection device mounted on said second platform, having a first section for crimping to electrical wires and a second section for connecting to said subscribers by way of said cabled wiring running in said predetermined direction.

9. The network interface unit according to claim 1, wherein each of said first and second releasable devices has first and second portions with the first portion being attached to said first side of said cover and the second portion being attached to the second sides of said first and second trays.

10. The network interface unit according to claim 7 further comprising a second connection device mounted on said first platform having a first section for crimping to electrical wires and a second section from connecting to said lines of said subscribers by way of said additional cabled wiring, said first section of said connection devices mounted on said first and second platforms being interconnected by a third cabled wiring.

11. The network interface unit according to claim 4, wherein said bottom portion of said first tray has a recessed section with a threaded opening, said plate has a extension with an opening lining up with said threaded opening of said recessed section, and said network interface unit further comprises a screw that is insertable into said opening of said plate and into said threaded opening of said recessed section.

* * * * *